(12) United States Patent
Wolfe et al.

(10) Patent No.: US 8,252,148 B2
(45) Date of Patent: Aug. 28, 2012

(54) CONTAINMENT EXTENSION AND PROCESSING METHOD

(75) Inventors: Stephen Wolfe, Richland, WA (US); Brian Brendel, Richland, WA (US)

(73) Assignee: Columbia Energy & Environmental Services, Inc., Richland, WA (US)

( * ) Notice: Subject to any disclaimer, the term of this patent is extended or adjusted under 35 U.S.C. 154(b) by 0 days.

(21) Appl. No.: 13/161,406

(22) Filed: Jun. 15, 2011

(65) Prior Publication Data

US 2011/0240457 A1 Oct. 6, 2011

Related U.S. Application Data

(62) Division of application No. 11/779,245, filed on Jul. 17, 2007, now Pat. No. 7,985,322.

(51) Int. Cl.
*B01D 1/22* (2006.01)
*B01D 3/42* (2006.01)
*B01D 53/00* (2006.01)
*G21F 9/08* (2006.01)

(52) U.S. Cl. ............... 203/1; 159/44; 159/47.3; 159/49; 159/DIG. 12; 159/DIG. 40; 159/DIG. 42; 203/40; 203/89; 203/98; 203/DIG. 18; 210/85; 210/718; 210/747.7; 210/805; 588/20; 588/260

(58) Field of Classification Search ................... 159/6.2, 159/43.1, 44, 47.3, 49, 901, DIG. 12, DIG. 40, 159/DIG. 42; 203/1, 40, 89, 98, DIG. 18; 210/85, 718, 747.7, 805; 588/20, 260
See application file for complete search history.

(56) References Cited

U.S. PATENT DOCUMENTS

| | | | |
|---|---|---|---|
| 4,160,692 A | 7/1979 | Mitchell | |
| 4,952,339 A | 8/1990 | Temus | |
| 5,102,503 A | 4/1992 | Silinski | |
| 5,316,743 A | 5/1994 | LeBlanc | |
| 5,360,067 A | 11/1994 | Meo, III | |
| 6,451,093 B1 | 9/2002 | Miles | |
| 6,470,690 B1 | 10/2002 | Sicherman | |
| 7,510,658 B2 | 3/2009 | Gordon | |
| 7,658,843 B2 | 2/2010 | Krock | |
| 7,722,739 B2 | 5/2010 | Haslem | |
| 2002/0010381 A1 | 1/2002 | Soundararajan | |

(Continued)

OTHER PUBLICATIONS

Davis, N.R., and Stover, D.L., "Waste on Wheels Bulk Waste Retrieval System: A Program for Accelerating Waste Removal From Savannah River Waste Tanks," Paper presented at the Waste Management (WM'07) Conference, Tucson, Arizona, Feb. 25-Mar. 1, 2007, 15 pages.

(Continued)

*Primary Examiner* — Virginia Manoharan
(74) *Attorney, Agent, or Firm* — Christensen O'Connor Johnson Kindness PLLC

(57) ABSTRACT

A mobile waste processing system and method is disclosed for processing materials in a tank, typically an underground storage tank. A mobile fluid processing module is disposed adjacent to or over the tank, and sealingly connected to the tank through a tank riser. Support equipment, which may include an electric power module, a chiller module, a heating module, and a control and monitor module, are disposed a distance from the processing module, and connected thereto. A pump and optionally a dispersal nozzle are deployed from the processing module into the tank, and effluent is extracted for processing. The processing trailer includes effluent processing equipment such as an evaporator and demister, condenser, vacuum pump, and interim storage tank. The effluent is processed, and at least a portion is removed. Some of the processed effluent may be returned to the tank.

8 Claims, 5 Drawing Sheets

U.S. PATENT DOCUMENTS

2004/0134662 A1   7/2004   Chitwood

OTHER PUBLICATIONS

Jolly, R.C., "Status of Mechanical Sludge Removal and Cooling Coil Closure at the Savannah River Site—F Tank Farm Closure Project—9225," Paper presented at the Waste Management (WM'09) Conference, Phoenix, Arizona, Mar. 1-5, 2009, 11 pages.

International Search Report and Written Opinion mailed Jul. 20, 2009, issued in corresponding International Application No. PCT/US2008/69851, filed Jul. 11, 2008, 14 pages.

CONTAINMENT EXTENSION AND PROCESSING METHOD

CROSS-REFERENCE TO RELATED APPLICATION

This application is a division of application Ser. No. 11/779,245, filed Jul. 17, 2007, now U.S. Pat. No. 7,985,322, the entire disclosure of which is hereby incorporated by reference herein.

BACKGROUND

Significant quantities of waste, including nuclear, industrial and/or chemical waste, are currently being stored at various locations throughout the United States and in other countries. The waste is typically stored in large tanks, such as large underground storage tanks ("USTs"). Much of this waste has been sequestered in USTs for a long time. Leakage or other undesirable release of waste materials, for example due to degradation of the USTs, seismic or other natural events, or from human error or deliberate actions, is an ongoing concern for such USTs.

The processing of nuclear materials for weapons production, for example, has generated residual wastes that are toxic, corrosive, and contain radioactive materials that have been stored in shielded and/or underground storage tanks. By one counting, the Department of Energy has 332 USTs that are being used to store radioactive and chemical mixed waste generated from weapon materials production, including over 100 million gallons of high-level and low-level waste. The handling of this waste material is complicated and difficult due to safety considerations and a desire to avoid or minimize adding to the waste inventory.

Processing or otherwise handling the waste requires a containment system that ensures no waste materials are released to the environment. To prevent any aerosol releases from USTs during normal operations, USTs usually have atmosphere containment systems wherein any gas or vapor release from the tank passes through an HEPA based filtering system.

The liquid portion of the stored waste presents a particular risk because any breach of the tank containment has the potential to release chemically and/or radiologically active liquid into the environment which can spread over a wide area due to the mobility of liquids. Reducing the liquid content of waste materials within a tank reduces the risks associated with leakage. In addition, concentrating the waste by removing clean water as evaporated condensate reduces the volume of the waste material, and therefore reduces the total tank volume required for containing the waste materials.

Of course, processing the waste materials, for example by reducing the liquid content of the stored materials in these tanks, raises safety issues associated with the hazardous nature of the materials. For example, the personnel exposure to risk must be kept as low as is reasonably achievable. In addition, the risk of releasing waste materials in various accident scenarios must be minimized. There is a need, therefore, for a system capable of processing materials in USTs, for example by reducing the volume of the materials and/or moving the waste to different storage facilities, in a safe and reliable manner.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A system and method are disclosed for processing material stored in a UST that provides for remote operation of the processing equipment, thereby increasing safety to workers and reducing the potential for exposure to the contents of the UST. In the preferred system, a mobile processing module is positioned near or over the tank, and a sealed connection between the mobile processing module and the tank is established. Deployable equipment for extracting material from the tank is provided, and is deployable through the sealed connection. For example, a deployable pump attached to a flexible hose may be lowered from the processing module into the UST, such that materials from the UST can be pumped into the processing module. The processing module preferably contains a separator, such as an evaporator, dryer, reverse osmosis separator or the like, that is adapted to receive at least a portion of the material extracted from the UST. A remote control module is also provided, disposed a distance from the UST and the processing module. The control module is operably connected to the processing module, such that a user can control equipment in the processing module from the control module. For example, the operator in the remote control module may lower the pump, and control the separator and/or other processing equipment in the processing module.

In an embodiment of the invention, the processing module is connected to the UST with a flexible connection system that engages a UST tank riser, and includes valves on both ends that are independently operable. The flexible connection system may be articulated to facilitate connection to the tank riser.

In an embodiment of the invention, the system also includes an electric power module, disposed remotely from the processing module, that provides electrical energy to the control module and to the mobile processing module.

In an embodiment of the invention, the system also includes a heat energy module that is connected to provide a heated fluid to the processing module, for example, a heated oil or steam. In a particular embodiment, an oil heated to not greater than 170° F. is circulated from the heat energy module to the processing module.

In a particular embodiment, the separator comprises an evaporator, and a demister to increase the efficiency of the evaporator, and fluid processing equipment in the process module includes a condenser adapted to receive vapor from the evaporator and condense the vapor, a return pump adapted to return non-condensed material from the evaporator to the UST and an interim condensate storage tank adapted to receive liquid condensate from the condenser.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
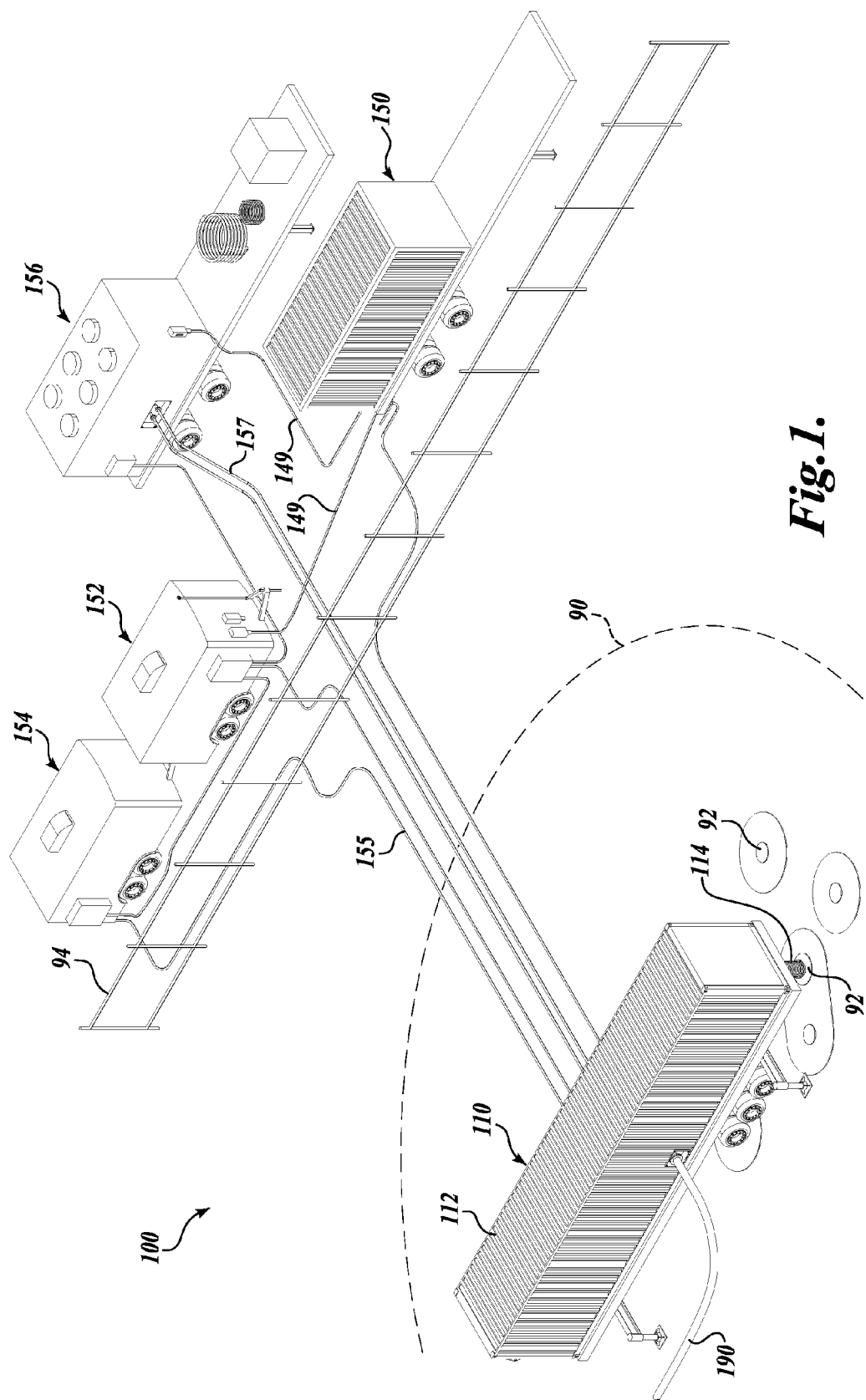
FIG. 1 illustrates a containment extension and waste processing system in accordance with the present invention for processing waste stored in an underground storage tank wherein waste stored in an underground storage tank is processed and returned to the tank.

A containment extension and waste processing system 100 for processing materials stored in UST 90 is shown in FIG. 1. The UST 90 (dashed line) includes one or more risers 92 that extend upwardly from the UST 90. The UST 90 is typically located in a restricted access area, as indicated by fence 94. The present system 100 may be used, for example, to reduce the volume of stored waste by removing non-hazardous materials such as water from the UST 90. Liquid reduction may be desirable to reduce risks associated with leakage, to mitigate the need for the construction of additional waste storage capacity and/or as a step in preparing the waste material for further processing such as vitrification and/or preparing the UST 90 for decommissioning.

The system 100 includes a mobile processing module 110, which includes processing equipment including a deployable extraction system and processing equipment that acts on the extracted waste. It is contemplated that the processing equipment may include various materials separation modules, such as an evaporator, dryer, reverse osmosis separator, filtering modules, dewatering modules or the like. In a current embodiment, the processing equipment is disposed in a trailer 112 that can be located adjacent to, or directly over, the UST 90. It is contemplated that systems according to the present invention may operate in at least three different modes: (1) new waste material may be concentrated or otherwise processed on site prior to being pumped into the UST 90; (2) waste material from the UST 90 may be extracted and processed, prior to being transported to an alternative storage or processing facility; or (3) waste material from the UST 90 may be extracted and processed, and at least a portion of the waste returned to the UST 90. An example of a system according to the present invention that is configured for extracting, processing and returning waste materials to the UST will now be described. The extensions or modifications required for other modes of operation will be readily apparent to persons of skill in the art, in view of the description provided herein.

The process trailer 112 includes a containment conduit or flexible extension system 114 that engages a tank riser 92 extending up from the UST 90 to provide a sealed fluid passageway between the UST 90 and the process trailer 112. This coupling is made such that the flexible connection system 114 allows components, pre-process materials, post-process materials, and clean (flush) fluids to be moved between the UST 90 and the process trailer 112 without a loss of materials to the environment. The system 100 shown in FIG. 1 further includes monitoring, control and support equipment, such as a remote monitoring and control module 150, an electric power module 152, a heating module 154, and a chiller module 156. Although these support modules are shown as separate trailers, it is contemplated that they may be combined onto fewer transportable platforms. It is also contemplated that one or more of the support functions may be locally available, and therefore not required. For example, suitable electrical power may be installed and available on site, obviating the need for the electric power module.

The control module 150, electric power module 152, heating module 154 and chiller module 156 are transported to the site of the UST 90, but are located a distance from the fluid processing module 110. By separating these support functions from the process trailer 112 and locating them a distance from the UST 90, exposure of personnel to risks associated with the UST 90 is minimized and maintenance simplified because much of the maintenance may be performed without entering the restricted area. In addition, the weight loads on the UST 90 is minimized because only the process trailer 112 is located over the UST 90.

Figure 2:
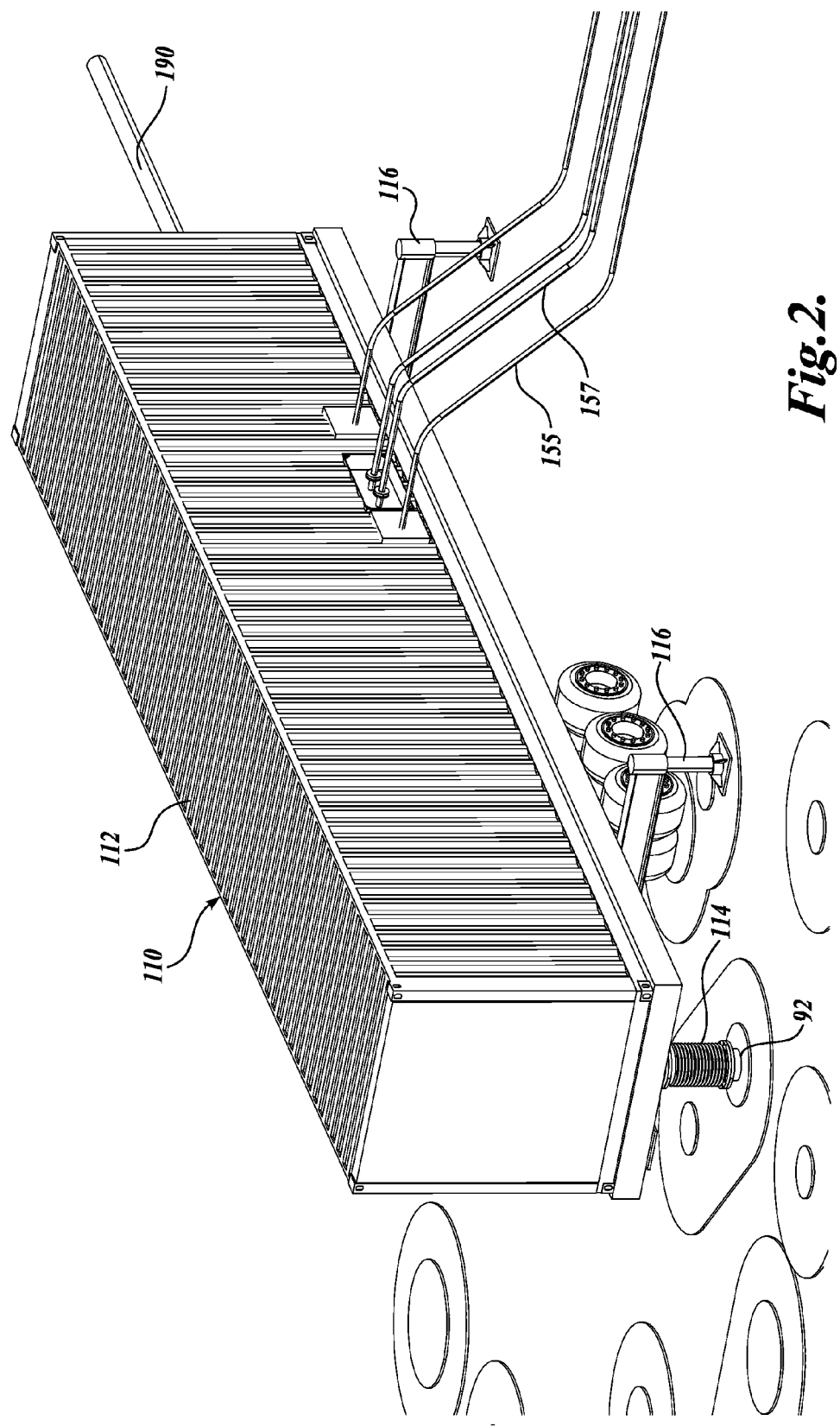
FIG. 2 is a detail view showing the process trailer for the processing system shown in FIG. 1.

A more detailed view of the fluid processing module 110 is shown in FIG. 2. As discussed below, the processing trailer 112 houses processing equipment to retrieve and process materials extracted from the UST 90. The processed material may then be stored on-board the trailer 112, directed to alternate storage, or returned to the UST 90. The flexible connection system 114 extends generally between the trailer 112 and the tank riser 92, and provides a sealed conduit between the tank riser 92 and the UST 90 for the passage of process equipment and process materials therebetween. The flexible connection system 114 preferably incorporates some degree of articulation to facilitate engagement with the tank riser 92.

In the preferred embodiment, the trailer 112 is substantially sealed, and becomes a common head-space with the UST 90 that maintains a slightly negative gauge pressure within the trailer 112 when the trailer is connected to the UST 90. A controlled air system flows from the ambient region into the trailer 112 and then into the UST 90. Typically, the UST 90 will have associated high efficiency particulate air (HEPA) filtering equipment either individually or through a centralized HEPA system for a cluster of USTs (not shown). The existing UST HEPA system processes gas outflow from the UST 90. Therefore, the controlled air flow from the trailer 112 into the UST 90 will be processed through the UST HEPA filtering equipment. The trailer 112 further includes a suitable filter to pre-filter air inflow into the trailer 112, and to guard against any outflow of hazardous materials. It will be appreciated that when the trailer 112 is attached to the tank riser 92, the trailer 112 and flexible connection system 114 form an extension of the UST 90 containment volume.

The process trailer 112 is preferably equipped with conventional outriggers 116 that stabilize the trailer 112, and distribute the weight load of the trailer 112 over a larger area. Although in the preferred embodiment the fluid processing module 110 is in an axled trailer 112, other transportable units may alternatively be used, including, for example, sleds or the like.

Figure 3A:
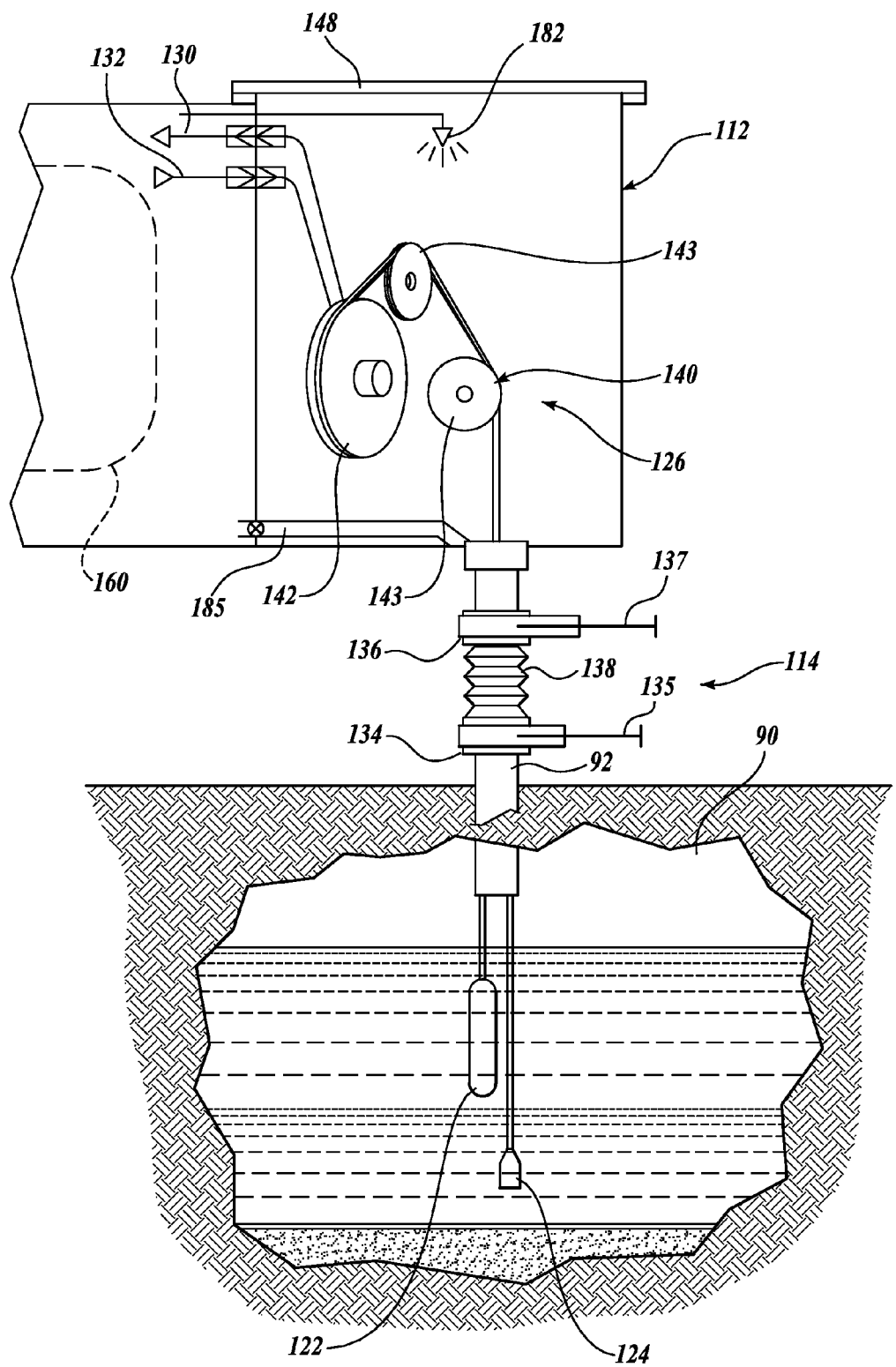
FIG. 3A shows schematically a detail view of a first embodiment of a deployment assembly for the processing system shown in FIG. 1.

FIG. 3A is a conceptual sketch showing a rearward portion of the process trailer 112 and the flexible connection system 114 engaging the tank riser 92 and forming a sealed passageway between the process trailer 112 and the interior of the UST 90. A currently preferred system for connecting the flexible connection system 114 to the UST 90 is illustrated. The trailer 112 and the flexible connection system 114 are configured, deployed, and coupled to the UST 90 so that it technically can be considered a part of the UST 90 containment. The flexible connection system 114 allows equipment and materials to pass between the process trailer 112 and the UST 90 without compromising the containment of the UST 90 and without a loss of waste materials to the environment.

Typically, the attachment would be accomplished using glove bag components (not shown) and glove bag handling procedures as are well-known in the art for transferring components into hazardous environments. A tank spool piece 134 having a gate valve 135 is attached to the tank riser 92. After installation, the glove bag would be removed with the tank spool piece gate valve 135 in a closed position. The process trailer 112 is then positioned over the tank spool piece 134 and a process trailer spool piece 136 having a second gate valve 137 is approximately aligned to the tank spool piece 134. A flexible interface conduit 138 is installed joining the tank spool piece 134 to the trailer spool piece 136. After ensuring the integrity of the sealing connections of the flexible interface piece 138, the two gate valves 135, 137 are opened thereby coupling the containment of the process trailer 112 to the containment of the UST 90. Although this coupling arrangement is currently preferred, other arrangements for coupling the process trailer 112 and the UST 90 that maintain containment during installation, operation, and removal of the components from a source of unprocessed liquid will be evident to a process engineer.

The fluid processing module 110 includes an extraction system that in this embodiment comprises a deployable pump 122 and a deployable liquid return dispersal nozzle 124. The pump 122 and the dispersal nozzle 124 are deployable into the UST 90 using a mechanical deployment system 126 that controls the position of the pump 122 and dispersal nozzle 124. The deployable pump 122 may be selected from a number of different types. For example, and not by way of limitation, the pump 122 may be a submersible pump that can be deployed to a specific depth, or may be a float pump to take advantage of density variations in the stored waste. Instrumentation and sensors, such as fluid level, temperature, density, viscosity, and/or radiation sensors may also be deployed through the flexible connection system 114 for process monitoring purposes.

The pump 122 extracts liquid from the UST 90 for processing, for example by directing the extracted fluid 130 to an evaporator 160 (partially shown, in phantom for clarity) in the processing trailer 112, where the waste may be concentrated. In this embodiment, the concentrated waste 132 is then returned to the UST 90 through the dispersal nozzle 124. Other processing equipment, including for example dryers, filters, and/or reverse osmosis separators may alternatively or additionally be utilized. In some applications the fluid inflow into the UST 90 may be directed as a liquid jet to locally agitate and mix the material in the UST 90 to facilitate extraction from the UST 90.

The deployment system 126 comprises separate hose and cable reel deployment assemblies 140 (one shown in FIG. 3A) for remotely deploying and controlling the position of the pump 122 and the dispersal nozzle 124. The deployment assembly 140 includes a hose reel 142 and associated guide pulleys 143 for each of the pump 122 and the dispersal nozzle 124. A remotely controllable drive mechanism (not shown) controls the hose reels 142, to control the deployment, retraction, and vertical position of the pump 122 and the dispersal nozzle 124. It is preferred, although not required, that the position of the pump 122 and dispersal nozzle 124 be independently controllable so that the relative vertical positioning can be optimized. It is also contemplated that sensors (not shown) may be used for assessing the location of this equipment within the UST 90 based on the physical properties of the UST-contained materials, such as density, temperature, conductivity, and the like. These sensors would support this remote processing by providing process assessment data for efficient use of the whole system.

Figure 3B:
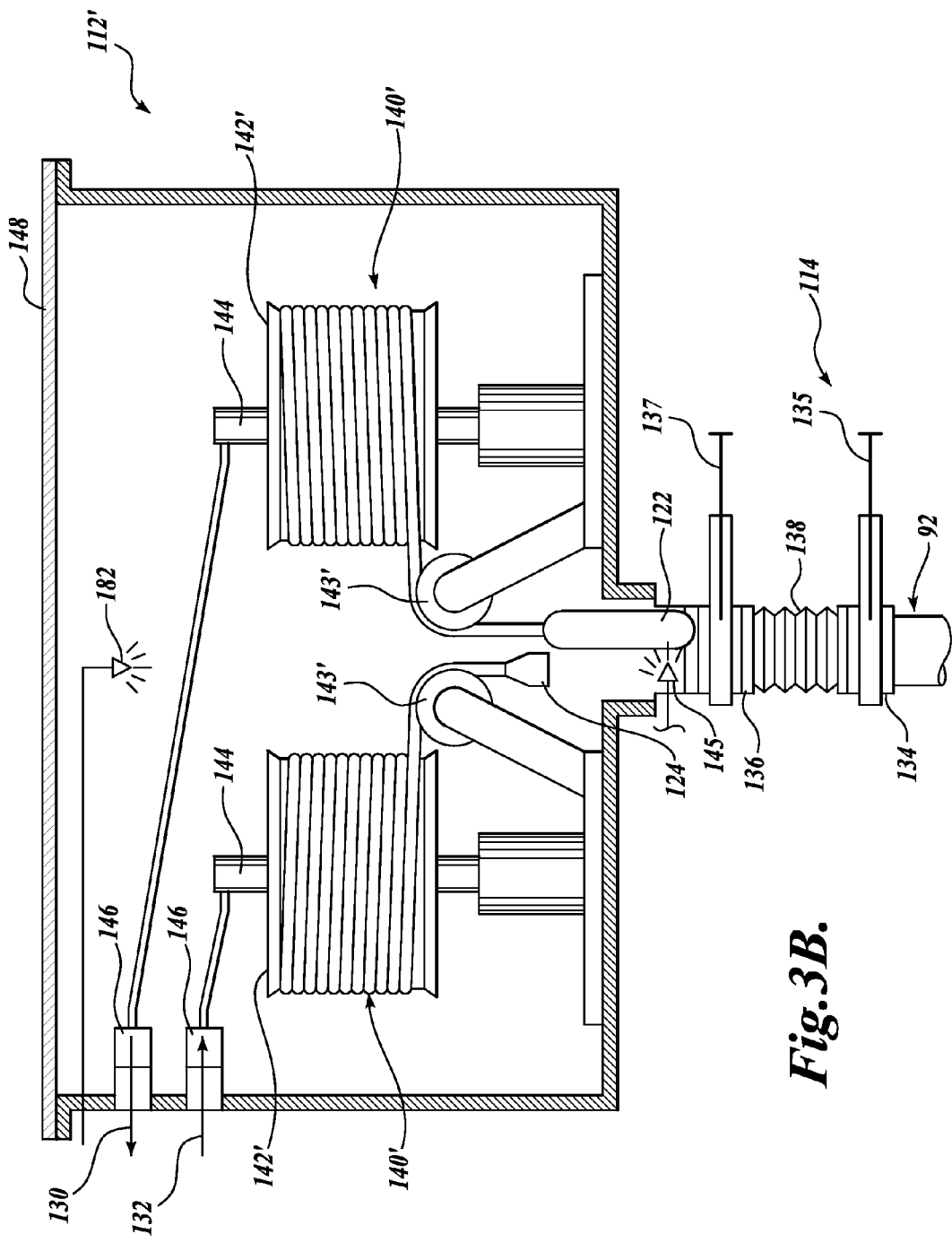
FIG. 3B shows schematically a detail view of a second embodiments of a deployment assembly for the processing system shown in FIG. 1.

A sketch of a second embodiment for a deployment assembly 140' is shown in FIG. 3B with the hose reels 142' oriented horizontally, and guide pulleys 143' disposed generally over the tank riser 92. The horizontal orientation of the hose reels 142' may be preferred, for example, if unassisted gravity drain of the hose contents is of concern. Each deployment assembly 140' includes a fluid and electrical commutator module 144 that allows the reel to deploy or retract hose and cable while fluid and electrical continuity are maintained to the evaporator 160.

In either embodiment, the deployment assemblies 140, 140' lower the pump 122 and the dispersal nozzle 124 through the spool pieces 134, 136 and valves 135, 137 into the UST 90.

In a preferred embodiment, each deployment assembly 140, 140' is modularly constructed to facilitate removal and replacement of the deployment assembly 140, 140' as a unit. A removable top plate 148 provides access to the deployment assemblies 140, 140'. A glove bag and bag-out methods may be used to remove and bag-out a potentially contaminated assembly. Prior to removal, the submersible pump 122 and the dispersal nozzle 124 are retracted into the process trailer 112 and removed as a unit with the deployment assembly 140, 140'. During the retraction process, the deployment assembly 140, 140' and/or the pump 122 and dispersal nozzle 124 may be washed down with a ring of high pressure nozzles 145 (shown schematically) disposed near the trailer spool piece 136 to remove contaminated material clinging to the surfaces of these components. The interior of the hoses, submersible pump 122, and dispersal nozzle 124 may be back washed to flush out residual tank material. Breakable connections 146 for the hoses and the electrical cables are mounted to facilitate replacement of the deployment assembly 140, 140'.

The disclosed system provides several advantages for processing stored waste. For example, when the waste is stored in USTs 90, structural considerations limit the total weight that can be safely placed over the USTs. By locating the support equipment a distance from the UST 90, the weight loads on the tank 90 are minimal. Also, locating the monitoring, control and support equipment a distance from the UST 90 reduces the exposure of workers to the underground storage tank which may contain hazardous components, thereby increasing worker safety.

Figure 4:
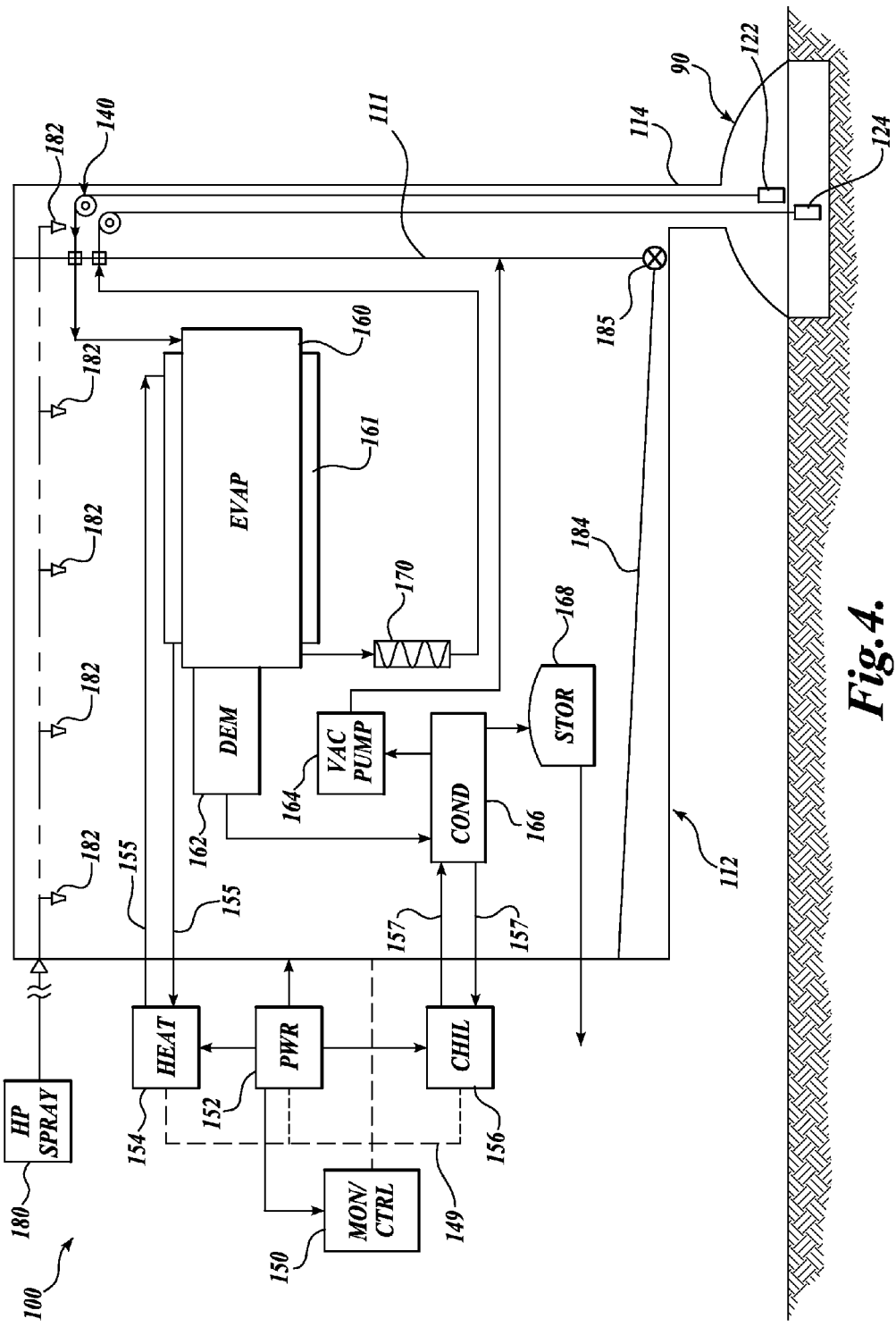
FIG. 4 shows an embodiment of a liquid reduction system for the waste processing system shown in FIG. 1.

A block diagram of a representative processing system 100, comprising a liquid reduction system, is shown in FIG. 4. The process trailer 112 includes the flexible connection system 114 connecting the process trailer 112 with the UST 90 such that the containment of the UST 90 is maintained and shared by the trailer 112. The liquid reduction system components in this embodiment include an evaporator 160 preferably including a demister 162 to improve separation efficiency, a vacuum pump 164, a condenser 166, and an interim condensate storage tank 168.

Of course, additional and/or alternative components and component arrangements would be apparent to persons of skill in the art. For example, it is contemplated that liquid reduction modules employing thermal methods and modules employing non-thermal methods, or a combination of thermal and non-thermal methods, may be used. Similarly, other waste processing functions may be performed in addition to or instead of liquid reduction, including filtering, encapsulation, and the like. Also, as would be understood by a process engineer of skill in the art, the processing system would include sensors for monitoring the processing parameters (for example, temperature, pressure, volume, and flow sensors), sensors for monitoring the contained materials (for example, density, temperature, and radiation sensors), and remotely operable valve and other control systems for controlling the flows within the system.

Referring now also to FIG. 1, in the currently system the operator(s) is located some distance from the process trailer 112, in the remote control and monitor module 150. Electrical conduit 149, as indicated by the dashed lines in FIG. 4 (and shown in FIG. 1) connects the control and monitor module 150 with the process trailer 112 and other modules, to receive monitoring information and provide control information to the system 100. It is contemplated that video and/or audio monitoring equipment such as microphones and video cameras (not shown) may also be used to monitor the system 100 and assist the operator. Although physical connections between the modules are shown in FIG. 1, it is contemplated that wireless communication and/or power transfer systems may alternatively be utilized, as are well-known in the art.

The deployment assembly 140 preferably comprises a portion of the process trailer 112 separated by an internal wall 111. The wall 111 provides a containment boundary between the hose deployment assembly 140 (which is expected to have contamination on the exterior of the hoses) from the fluid processing module 110 portion of the process trailer 112 (which is not expected to have contamination of the exterior surfaces of the piping). The containment structure surrounding the liquid reduction components is connected with the flexible connection system 114 through a filtered port that allows air to flow between the contained areas, and a drain pan collection discharge 186, which returns any collected liquids back to the UST 90.

Dilute waste material from the UST 90 is extracted by the pump 122 and ported into the evaporator 160 through the hose and cable reel deployment assembly 140. The evaporator 160 may be a wiped film type evaporator, and includes a thermal jacket 161 that receives heat, for example through conduits 155 circulating heated oil from the heating module 154. It will be appreciated that locating the heating module 154 a distance away from the process trailer 112 increases safety. In the preferred embodiment the heated oil is provided at a temperature of not greater than 170° F., so that the liquid reduction is accomplished in a "non-thermal process," i.e., in a process that does not exceed 170° F. Although not currently preferred, it is contemplated that steam may be provided to the thermal jacket 161 rather than heated oil. In such case, the steam may be vented or otherwise utilized, rather than being circulated back to the heating module 154.

The concentrated waste with reduced liquid content is returned to the hose and reel deployment assembly 140 with a pump 170, for example a progressive cavity pump, and to the UST 90 through the dispersal nozzle 124. The effluent extracted from the waste is ported through a de-mister 162 to remove aerosol and then reduced to a liquid state by a condenser 166. Chilled refrigerant is provided to the condenser 166 through conduits 157 that circulate refrigerant from the chiller module 156, which is also disposed some distance from the process trailer 112. The recovered liquid may be accumulated in a temporary storage tank 168, and is then removed from the process trailer 112 for further processing and/or disposal. For example, a conduit 190 may be provided to pump condensate from the temporary storage tank 168 to a transportation and/or storage tank (not shown). Sensors (not shown) located on the liquid piping monitor the properties of the condensate liquid to ensure it meets requirements for removal from the containment of the process trailer 112. A vacuum pump 164 is connected to the condenser 166 to facilitate startup of the wiped-film evaporator 160. The vacuum pump 164 output (vapor and/or gas) is returned to the flexible connection system 114 and thereby returned the UST 90 containment.

The processing module 110 may also include a high pressure spray system 180, which is connected to a source of high pressure liquid for removing waste materials from the process trailer 112. The high pressure spray system 180 includes a number of spray nozzles 182 disposed throughout the process trailer 112, and operable to selectively clean the interior of the process trailer 112. The floor of the process trailer 112 comprises a sloped drip pan 184 that directs fluids on the trailer floor to gravitationally drain 185 into the UST 90 through the flexible connection system 114.

When the desired processing has been completed, the deployment system 140 retracts the submersible pump 122 and the dispersal nozzle 124 from the UST 90. The flexible connection system 114 is disengaged, to disconnect the process trailer 112 from the UST 90, and the UST 90 is closed. The processing module 110 may then be cleaned up, decontaminated and/or moved to a second UST 90 and set up to process materials disposed in the second UST 90, as described above.

Although the disclosed system has been described with reference to a system reducing the volume of waste already disposed in an existing UST 90, it will be appreciated that the system 100 may readily be used, with straightforward changes that would be obvious to a person of skill in the art after studying the present disclosure, to pre-process new or externally obtained waste for disposal in a UST. In this alternative mode of operation, a waste stream is provided to the process trailer 112 from an external source, and the volume is reduced by the evaporator 160 prior to porting the reduced waste to the UST. In a third contemplated mode of operation, the present system 100 (with straightforward modifications) may be used to remove some or substantially all of the waste from a UST. In this mode of operation, the reduced waste would not be returned to the UST 90 by the pump 170, but would be piped or otherwise ported to a new storage container or to a system for further processing.

While illustrative embodiments have been illustrated and described, it will be appreciated that various changes can be made therein without departing from the spirit and scope of the invention.

The invention claimed is:

1. A method for processing waste disposed in a tank comprising the steps of:
   locating a processing module adjacent the tank; wherein the processing module includes effluent processing equipment;
   connecting the tank to the processing module with a sealed fluid connection between the tank and the processing module;
   locating a remote control module such that the remote control module is disposed remotely from the processing module and is operably connected to the processing module;
   controlling the processing module from the remote control module, deploying an effluent extraction system through the sealed fluid connection from the processing module into the tank; and
   extracting effluent from the tank into the processing module and processing the effluent with the fluid processing equipment.

2. The method of claim 1, wherein the effluent processing equipment comprises an evaporator and a condenser, and wherein processing comprises reducing the volume of the effluent by extracting condensate from the effluent.

3. The method of claim 2, further comprising providing a chiller module disposed remotely from the processing module, wherein the chiller module is adapted to circulate a chilled liquid to the condenser.

4. The method of claim 2, further comprising providing an electric power module disposed remotely from the processing module, and connecting the electric power module to the processing module and to the remote control module.

5. The method of claim 2, wherein the evaporator comprises a demister.

6. The method of claim 2, wherein the evaporator is a wiped film evaporator.

7. The method of claim 1, wherein the fluid extraction system comprises a deployable pump.

8. The method of claim 7, further comprising the step of returning at least a portion of the extracted effluent to the tank.

* * * * *